Dec. 21, 1926.
T. E. MURRAY
1,611,664
WHEEL AND BRAKE DRUM
Filed March 11, 1924
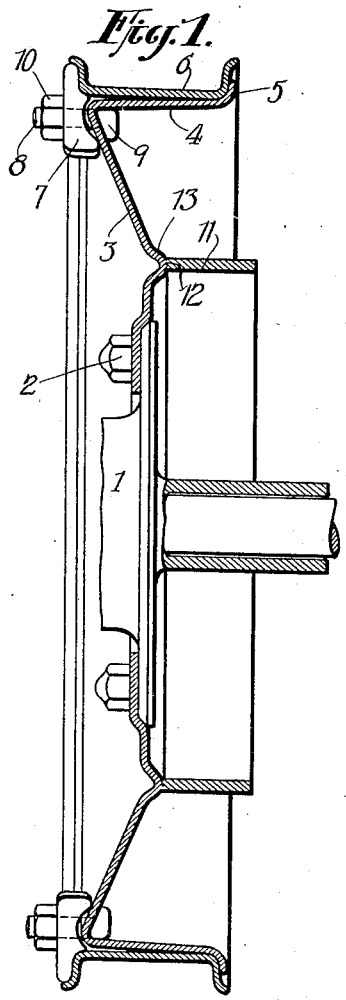
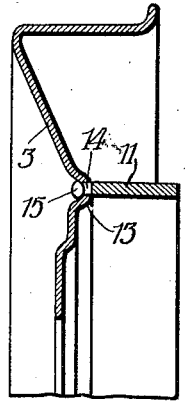
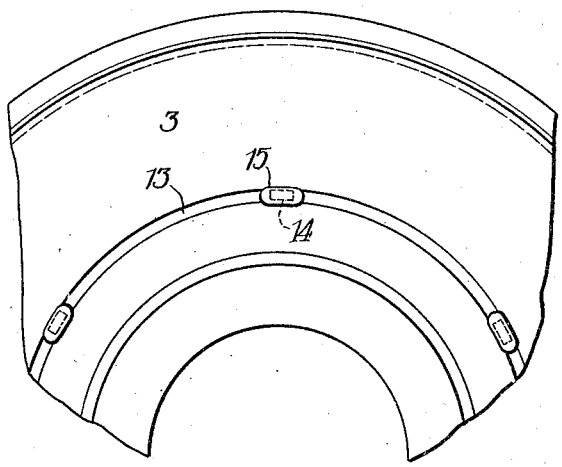
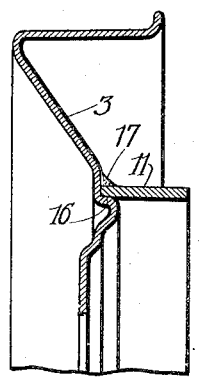
INVENTOR
Thomas E. Murray
BY
ATTORNEY Patented Dec. 21, 1926.

1,611,664

UNITED STATES PATENT OFFICE.

THOMAS E. MURRAY, OF BROOKLYN, NEW YORK.

WHEEL AND BRAKE DRUM.

Application filed March 11, 1924. Serial No. 698,397.

My invention aims to provide an automobile wheel of the general type known as disc wheels and a brake drum therefor, and to save weight and expense in such constructions.

The accompanying drawings illustrate embodiments of the invention.

Fig. 1 is a diametral section partly in elevation of a wheel and brake drum;

Fig. 2 is a partial section of an alternative arrangement;

Fig. 3 is an outside elevation of Fig. 2;

Fig. 4 is a partial section of another arrangement.

Referring to the embodiments of the invention illustrated, the driven hub 1 has fastened to it by bolts 2 the disc or annular plate 3. These discs are made of various shapes and diametral section. At the outer edge the disc is formed with a rim 4 approximately parallel with the axis of the wheel but slightly tapering toward the outer side of the wheel. The rim or axial flange of the wheel has at its inside edge a transverse outward flange 5. The demountable rim 6 which carries the tire is placed on the flange 4 of the disc and pressed up against the stop flange 5 and is held there by means of lugs 7 arranged at intervals around the circumference. Bolts 8 have heads 9 fitting in the angle of the disc 3 and flange 4, by which they are held against turning, the shank of each bolt passing through the disc 3 and the clip and their threaded ends being engaged by nuts 10 to force and hold the tire rim in place.

I have provided a very light and economical brake drum for attachment to this style of wheels. It consists of a simple ring or drum 11 formed by bending a straight strip of sheet metal of the width of the drum such as can be stamped without waste from a sheet. One edge of this drum is joined, as by a butt welded joint 12 to the inner face of the disc 3. For the purpose of conveniently making such a butt weld the disc is preferably stamped to form an annular rib 13 on its inner face fitting the edge of the brake drum.

Or the parts may be joined as in Figs. 2 and 3. Here the drum 11 has projections 14 at intervals extending through similarly spaced openings in the disc 3, and the parts are held by additional metal 15 deposited over the ends of the projections 14 by the arc weld or acetylene weld method. In addition the edge of the drum 11 may be butt welded to the rib 13 if desired. The interlocking engagement by the projections 14 holds the drum positively against rotation on the disc.

According to Fig. 4 the disc 3 is stamped to form a rib for the edge of the brake drum and also a flange 16 on the inner side and about which the drum 11 fits and by which the latter is easily placed in accurate position during the operation of welding its edge to the disc. The welding may be accomplished with or without the interlocking arrangement of Fig. 2. The joint may be made by butt welding or by acetylene or arc welding as indicated at 17 or by both as described in connection with Figs. 2 and 3.

The arrangement shown in Fig. 2 may be strengthened by welding, either butt welding as in Fig. 1 or arc or acetylene welding with metal deposited in the corners where the drum 11 meets the rib 13.

The disc of the wheel may be stamped from a single sheet as in the cases illustrated or it may be made of a plurality of pieces as for example in another application Serial No. 698,400 which I have filed, and in which this style of disc is specifically claimed.

The drum may be applied as described also to various other types of wheel.

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departure from the invention as defined in the following claims.

What I claim is:

1. The combination of a disc wheel, the disc being made of a continuous piece of sheet metal from center to outer edge bent to form a rib on its inner face and a brake drum comprising a bent strip of sheet metal of substantially the width of the drum having its edge butt-welded to the ribbed portion of the disc.

2. The combination with a disc wheel of a brake drum comprising a bent strip of sheet metal of substantially the width of the drum and having one edge butt-welded to the inner face of the disc, said disc being of sheet metal bent to form an inward projection fitting within the drum.

3. The combination with a metal wheel having a rib on its inner face of a brake drum comprising a bent strip of sheet metal of substantially the width of the drum and having its edge butt-welded to the ribbed portion of the wheel.

In witness whereof, I have hereunto signed my name.

THOMAS E. MURRAY.